US008601230B2

(12) United States Patent
Miyamae et al.

(10) Patent No.: US 8,601,230 B2
(45) Date of Patent: Dec. 3, 2013

(54) VOLUME MIGRATION PROGRAM, METHOD AND SYSTEM

(75) Inventors: Takeshi Miyamae, Kawasaki (JP); Yoshitake Shinkai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 937 days.

(21) Appl. No.: 11/894,998

(22) Filed: Aug. 22, 2007

(65) Prior Publication Data

US 2008/0126730 A1   May 29, 2008

(30) Foreign Application Priority Data

Nov. 24, 2006   (JP) .................................. 2006-316454

(51) Int. Cl.
*G06F 12/00* (2006.01)
(52) U.S. Cl.
USPC .............. 711/165; 711/2; 711/202; 711/203; 711/206; 711/E12.081
(58) Field of Classification Search
None
See application file for complete search history.

(56) References Cited

U.S. PATENT DOCUMENTS

| | | | |
|---|---|---|---|
| 5,983,317 A | 11/1999 | Kanda et al. | |
| 7,096,319 B2 | 8/2006 | Mogi et al. | |
| 7,469,327 B2 | 12/2008 | Kawamura et al. | |
| 7,478,221 B1 * | 1/2009 | Karr et al. ..................... | 711/203 |
| 8,005,793 B1 * | 8/2011 | Jernigan, Iv .................. | 707/639 |
| 2004/0080558 A1 * | 4/2004 | Blumenau et al. ............. | 347/19 |
| 2004/0230787 A1 * | 11/2004 | Blumenau et al. ............. | 713/1 |
| 2006/0047923 A1 | 3/2006 | Kodama | |
| 2006/0129537 A1 | 6/2006 | Torii et al. | |
| 2007/0106841 A1 * | 5/2007 | Stewart ......................... | 711/112 |

FOREIGN PATENT DOCUMENTS

| | | |
|---|---|---|
| EP | 1 158 397 A2 | 11/2001 |
| JP | 2005-285058 | 10/2005 |
| JP | 2006-127106 | 5/2006 |
| WO | WO 2005/101181 A2 | 10/2005 |

OTHER PUBLICATIONS

German Office Action issued May 27, 2010, in corresponding German Application No. 102007 041 691.3-53.
Minutes of the Hearing issued by the German Patent Office on Sep. 8, 2010, in corresponding German Application No. 10 2007 041 691. 3-53.
Office Action issued by the Japanese Patent Office in Japanese App. No. 2006-316454 dated Oct. 4, 2011.

* cited by examiner

*Primary Examiner* — Alford W. Kindred
*Assistant Examiner* — Arvind Talukdar
(74) *Attorney, Agent, or Firm* — Greer, Burns & Crain, Ltd.

(57) ABSTRACT

A volume migration method for causing to carry out a migration from a first volume manager to a second volume, includes: by causing the first volume manager to carry out actual accesses, obtaining information of correspondence, by the first volume manager, between logical volume offsets and physical blocks on a physical medium; judging, based on the obtained information of the correspondence, whether or not an exceptional data layout is carried out; and when it is judged that the exceptional data layout is not carried out, updating only a header area on the physical medium for the second volume manager. Incidentally, the aforementioned obtaining is carried out by using a program module for blocking access by the first volume manager to the physical medium. Thus, when only the header area is updated after it is confirmed the exceptional data layout is not made, the high-speed volume migration becomes possible.

16 Claims, 7 Drawing Sheets

| ID | DEVICE SPECIAL FILE NAME |
|----|--------------------------|
| 1  | /dev/rdsk/c3t4d0         |
| 2  | /dev/rdsk/c3t4d1         |
| 3  | /dev/rdsk/c3t4d2         |
| 4  | /dev/rdsk/c3t4d3         |

FIG.3

| ID | PHYSICAL DISK ID | OFFSET | SIZE |
|---|---|---|---|
| 1 | 1 | 16 | 1000000 |
| 2 | 1 | 1000016 | 1000000 |
| 3 | 2 | 16 | 1000000 |
| 4 | 2 | 1000016 | 1000000 |
| 5 | 3 | 16 | 1000000 |
| 6 | 3 | 1000016 | 1000000 |
| 7 | 4 | 16 | 1000000 |
| 8 | 4 | 1000016 | 1000000 |

FIG.4

| ID | LAYOUT | (SET OF SUBDISKS) OR [SET OF LOGICAL VOLUMES] | VOLUME SIZE |
|---|---|---|---|
| 1 | STRIPE | (1, 3) | 1000000 |
| 2 | STRIPE | (5, 7) | 1000000 |
| 3 | MIRROR | [1, 2] | 1000000 |
| 4 | CONCAT | (2, 4) | 2000000 |
| 5 | CONCAT | (6, 8) | 2000000 |

| ID | DEVICE SPECIAL FILE NAME |
|---|---|
| 1 | /dev/rdsk/c3t4d0 |
| 2 | /dev/rdsk/c3t4d1 |
| 3 | /dev/rdsk/c3t4d2 |
| 4 | /dev/rdsk/c3t4d3 |
| 5 | /dev/rdsk/c3t4d4 |

FIG.12

| ID | PHYSICAL DISK ID | OFFSET | SIZE |
|---|---|---|---|
| 1 | 1 | 16 | 1000000 |
| 2 | 1 | 1000016 | 1000000 |
| 3 | 2 | 16 | 1000000 |
| 4 | 2 | 1000016 | 1000000 |
| 5 | 3 | 16 | 1000000 |
| 6 | 3 | 1000016 | 1000000 |
| 7 | 4 | 16 | 1000000 |
| 8 | 4 | 1000016 | 1000000 |
| 9 | 5 | 16 | 1000000 |
| 10 | 5 | 1000016 | 1000000 |

FIG.13

| ID | LAYOUT | (SET OF SUBDISKS) OR [SET OF LOGICAL VOLUMES] | VOLUME SIZE |
|---|---|---|---|
| 1 | STRIPE | (1, 3) | 1000000 |
| 2 | STRIPE | (5, 7) | 1000000 |
| 3 | MIRROR | [1, 2] | 1000000 |
| 4 | CONCAT | (2, 4, 9) | 2000000 |
| 5 | CONCAT | (6, 8, 10) | 2000000 |

VOLUME MIGRATION PROGRAM, METHOD AND SYSTEM

TECHNICAL FIELD OF THE INVENTION

This invention relates to a volume migration technique.

BACKGROUND OF THE INVENTION

Normally, when the volume is migrated between different volume managers, data copy is carried out by reading out, by the volume manager of the migration source, data in a data area from a disk of the migration source, and writing, by the volume manager of the migration destination, the read data into a disk of the migration destination.

In addition, when functions of the volume manager of the migration source are completely open to the public, the migration is carried out at high speed by rewriting only a header area of the header area and the data area, which are stored in the disk, as long as the volume manager of the migration destination supports equivalent or more functions.

Incidentally, for example, U.S. Pat. No. 5,983,317 discloses a technique for enabling data sharing between the mainframe and the open system. Specifically, a disk control apparatus is connected with a CPU the UNIX (Registered Trade Mark) operating system controls via the SCSI interface, and is connected with a CPU the VOS3 operating system controls via the channel interface. In the CPU, the CKD record access library and the VSAM access library exist, and the CPU accesses the VSAM record stored in the CKD format into the disk control apparatus, in the FBA format, and can access an application program of the CPU as the VSAM record based on the VSAM control information. This publication discusses data sharing between different operation systems, and does not discuss the complete migration of the volume manager.

However, because the volume size of the volume to be migrated is rapidly increased, recently, the initially described method of coping the data area requires a huge time for the volume migration. Therefore, there are many cases where the method cannot be actually carried out.

In addition, when the volume manager of the migration source supports a technique such as an alternating block (other block mapped when a block defect occurs in the primary data storage location) and this specification is not completely open to the public, the volume manager of the migration destination cannot map an appropriate block at a pertinent offset of the logical volume.

SUMMARY OF THE INVENTION

Therefore, an object of this invention is to provide a technique for enabling the high-speed volume migration even when the volume manager whose specification is not completely open to the public is used.

A volume migration method according to this invention is a volume migration method for causing to carry out a migration from a first volume manager to a second volume, including: by causing the first volume manager to carry out actual accesses, obtaining information of correspondence, by the first volume manager, between logical volume offsets and physical blocks on a physical medium; judging, based on the obtained information of the correspondence, whether or not an exceptional data layout is made; and when it is judged that the exceptional data layout is not made, updating only a header area on the physical medium for the second volume manager. Incidentally, the aforementioned obtaining is carried out by using a program module for blocking the actual access by the first volume manager to the physical medium.

Thus, when only the header area is updated after it is confirmed that the exceptional data layout is not made, the high-speed volume migration becomes possible.

In addition, the volume migration method may further include: when it is judged that the exceptional data layout is made, reading out data relating to the exceptional data layout from the physical medium via the first volume manager; updating the header area on the physical medium for the second volume manager; and causing the second volume manager to write the read data relating to the exceptional data layout onto the physical medium. When the exceptional data layout is made, by writing only the data relating to the exceptional data layout by the volume manager of the migration destination, it is possible to reduce the amount of data to be copied and high-speed migration becomes possible.

Furthermore, the aforementioned obtaining may include: identifying logical volume offsets to which other normal program accesses; and causing the first volume manager to carry out the actual access to the identified logical volume offsets again. By carrying out such a processing, it becomes possible to shorten the time to stop the system due to the migration work.

Incidentally, after causing to carry out the actual access to all the logical volume offsets and until unprocessed logical volume offsets among the identified logical volume offsets are lost, the identifying and the causing the first volume manager are iterated.

Furthermore, this invention may further include: reading out volume configuration information stored in a header area on the physical medium through the first volume manager, and calculating second correspondence between the logical volume offsets and the physical blocks on the physical medium based on the volume configuration information. At that time, the aforementioned judging may include comparing information of the second correspondence with the obtained information of the correspondence.

Moreover, this invention may further include copying data from the physical medium being used to a second physical medium. In this case, the obtaining and subsequent processing may be carried out for the second physical medium. This is a case where the disk migration is also carried out.

Furthermore, when updating the header for the second volume manager, an expansion of the volume may be registered. For example, this is a case where the disk is added and the expansion of the volume is also carried out.

Incidentally, it is possible to create a program for causing a computer to execute the volume migration method. The program is stored into a storage medium or a storage device such as a flexible disk, a CD-ROM, a magneto-optical disk, a semiconductor memory, or a hard disk. In addition, the program may be distributed as digital signals over a network in some cases. Incidentally, data under processing is temporarily stored in the storage device such as a computer memory.

DETAILED DESCRIPTION OF THE PREFERRED EMBODIMENTS

Embodiment 1

Figure 1:
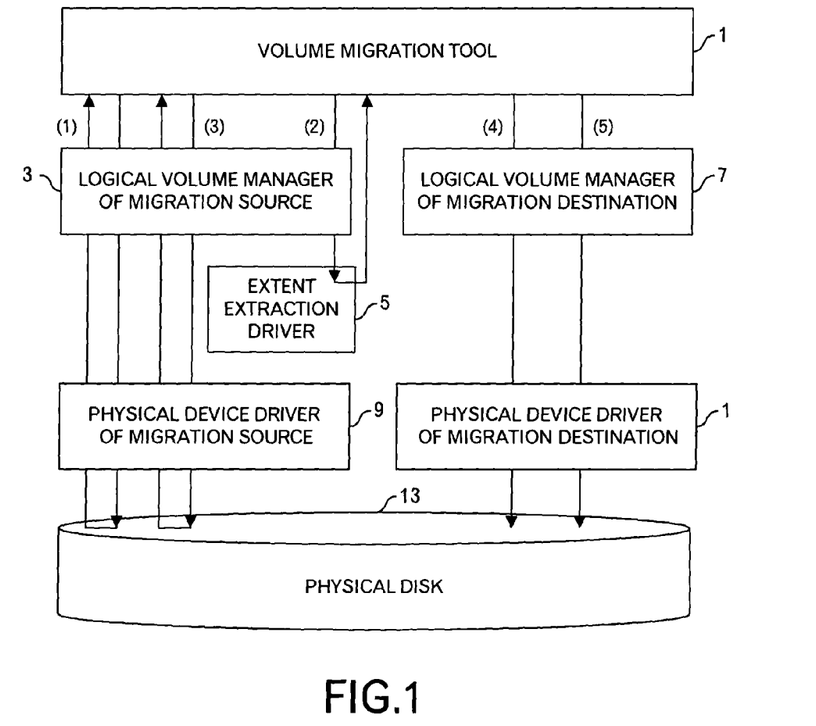
FIG. 1 is a functional block diagram according to a first embodiment of this invention.

FIG. 1 shows an outline diagram of a system according to a first embodiment of this invention. A normal application uses a physical disk 13 through a logical volume manager 3 of the migration source and a physical device driver 9 of the migration source. When carrying out the volume migration, a processing as described below is carried out by executing a volume migration tool 1, an extent extraction driver 5, a logical volume manager 7 of the migration destination and a physical device driver 11 of the migration destination.

Figure 2:
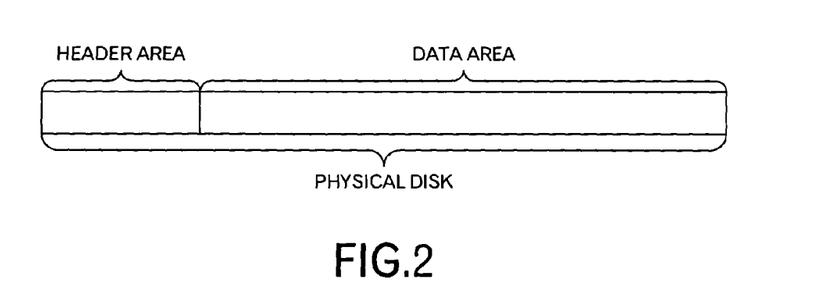
FIG. 2 is a diagram showing a configuration of a physical disk.
Figure 3:
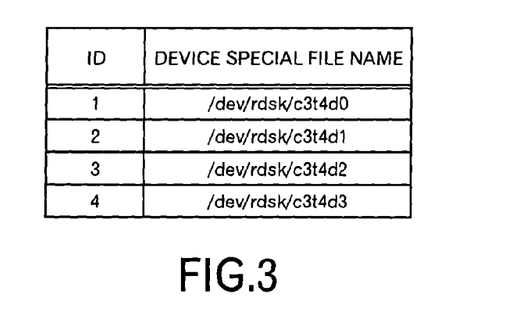
FIG. 3 is a diagram showing an example of physical device information.
Figure 4:
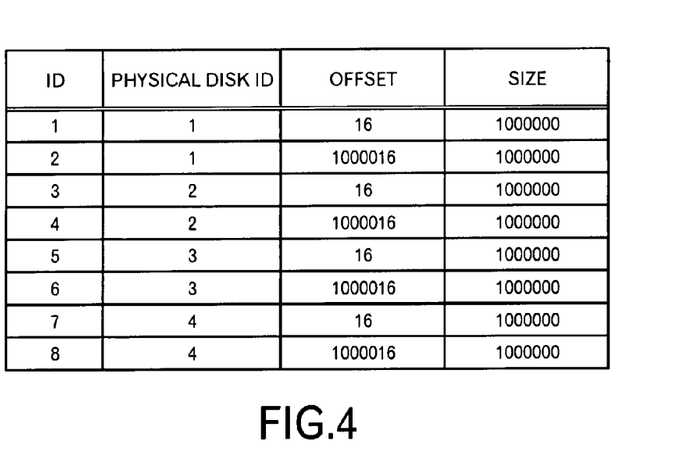
FIG. 4 is a diagram showing an example of subdisk information.
Figure 5:
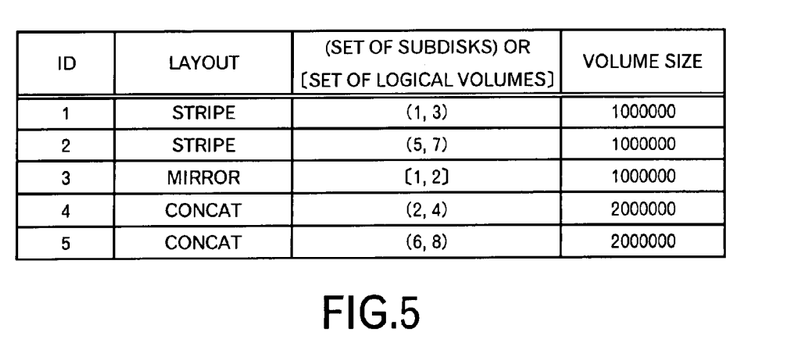
FIG. 5 is a diagram showing an example of logical volume information.

In the physical disk 13, as shown in FIG. 2, a header area and a data area are provided. Data as shown in FIGS. 3 to 5 is stored in the header area. Incidentally, FIGS. 3 to 5 show an example in which 4 physical disks 13 are used.

First, as shown in FIG. 3, an ID of the physical disk and a corresponding device special file name are registered as physical device information into the header area.

In addition, as shown in FIG. 4, a subdisk ID, a physical disk ID, an offset and a size are registered as subdisk information into the header area. For example, the subdisk whose ID is "1" is provided on the physical disk whose ID is "1", its start offset is "16", and its size is "1000000".

Figure 6:
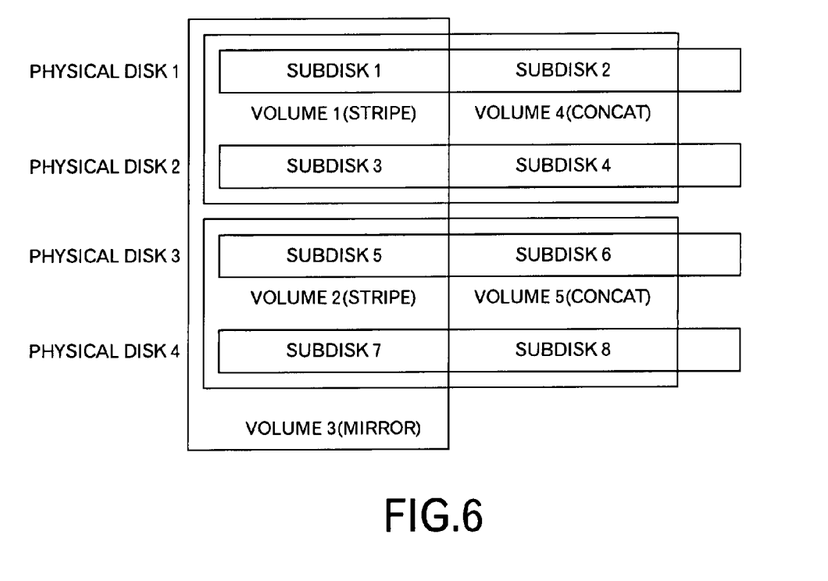
FIG. 6 is a schematic diagram of FIGS. 3 to 5.

Furthermore, as shown in FIG. 5, a logical volume ID, a layout (STRIPE/MIRROR/CONCAT(Concatenation)), (a set of subdisks) or [a set of logical volumes] and a volume size are registered as logical volume information into the header area. In an example of FIG. 5, the logical volume whose ID is "1" configures STRIPE by using the subdisks whose IDs are "1" and "3". The logical volume whose ID is "2" configures STRIPE by using the subdisks whose IDs are "5" and "7". Furthermore, the logical volume whose ID is "3" configures MIRROR by using the logical volume whose IDs are "1" and "2". The logical volume show ID is "4" configures CONCAT by using the subdisks whose IDs are "2" and "4". The logical volume show ID is "5" configures CONCAT by using the subdisks whose IDs are "6" and "8". Such a logical volume configuration is as shown in FIG. 6.

Next, a processing content of the system shown in FIG. 1 will be explained by using FIGS. 7 to 9. As shown by an arrow (1) in FIG. 1, the volume migration tool 1 reads out volume configuration information on the header area of the physical disk 13 through the logical volume manager 3 of the migration source and the physical device driver 9 of the migration source (step S1). The volume configuration information is data as shown in FIGS. 3 to 5.

Then, the volume migration tool 1 calculates a mapping between the logical blocks and the physical blocks from the read volume configuration information (step S3). For example, as shown in FIG. 6, the subdisk 1 (ID=1) in the physical disk 1 (ID=1) and the subdisk 3 (ID=3) of the physical disk 2 (ID=2) configure STRIPE in the logical volume 1 (ID=1), and the subdisk 5 (ID=5) in the physical disk 3 (ID=3) and the subdisk 7 (ID=7) in the physical disk 4 (ID=4) configure STRIPE in the logical volume 2 (ID=2), and further the logical volume 1 and the logical volume 2 configure MIRROR. Therefore, the first logical block of the logical volume 3 is mapped to the start offset 16 of the physical disk 1 and the start offset 16 of the physical disk 3. Similarly, the second logical block of the logical volume 3 is mapped to the start offset 16 of the physical disk 2 and the start offset 16 of the physical disk 4. Thus, the mapping between the logical blocks and the physical blocks is calculated from data as shown in FIGS. 3 to 5.

Next, as shown by an arrow (2) of FIG. 1, the volume migration tool 1 causes the logical volume manager 3 of the migration source to issue I/Os to the entire volume, and extracts actual mapping through the extent extraction driver 5 (step S5). A specific processing of this step will be explained by using FIGS. 8 and 9.

Figure 9:
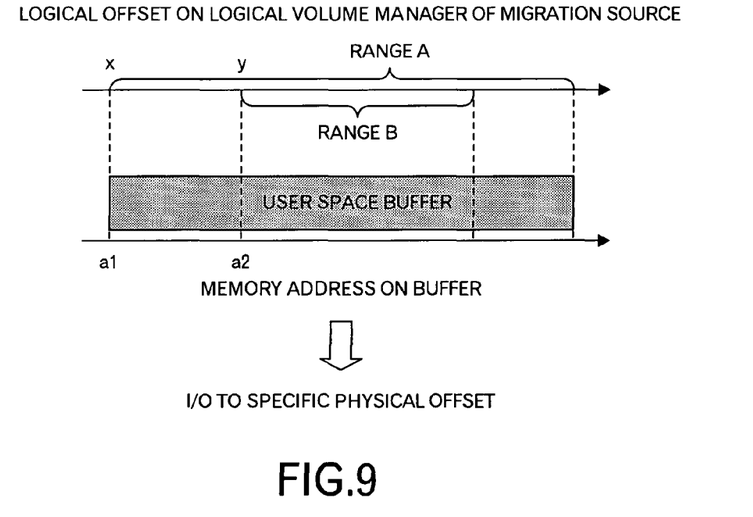
FIG. 9 is a diagram showing an address relation in the mapping obtaining processing.

First, as shown in FIG. 9, the volume migration tool 1 secures a range A from "a1" on a buffer memory, and outputs a command for reading out data from a logical offset "x" by the range A to the logical volume manager 3 of the migration source (step S21). The logical volume manager 3 of the migration source divides the range A, and issues I/Os to the corresponding physical offset for each sub range (step S23). The processing of this step is similar to the conventional one. Incidentally, the logical volume manager 3 of the migration volume issues I/Os to a range B generated by the range division as shown in FIG. 9.

Here, the extent extraction driver 5 intercepts the I/Os from the logical volume manager 3 of the migration source, obtains sets of a start memory address "a2" of the storage destination of each divided area and the physical offset of the corresponding I/O destination, and outputs the sets to the volume migration tool 1 (step S25). Incidentally, because, at this time, the extent extraction driver 5 does not output the I/Os to the physical device driver 9 of the migration source, any access to the physical disk 13 does not occur and the processing time can be shortened.

Finally, the volume migration tool 1 obtains the correspondence between the physical offsets and the start logical offset y (=x+(a2−a1)) of the logical block (step S27).

Thus, by using the actual access (I/O), a portion the exceptional data layout exits can be identified.

Figure 7:
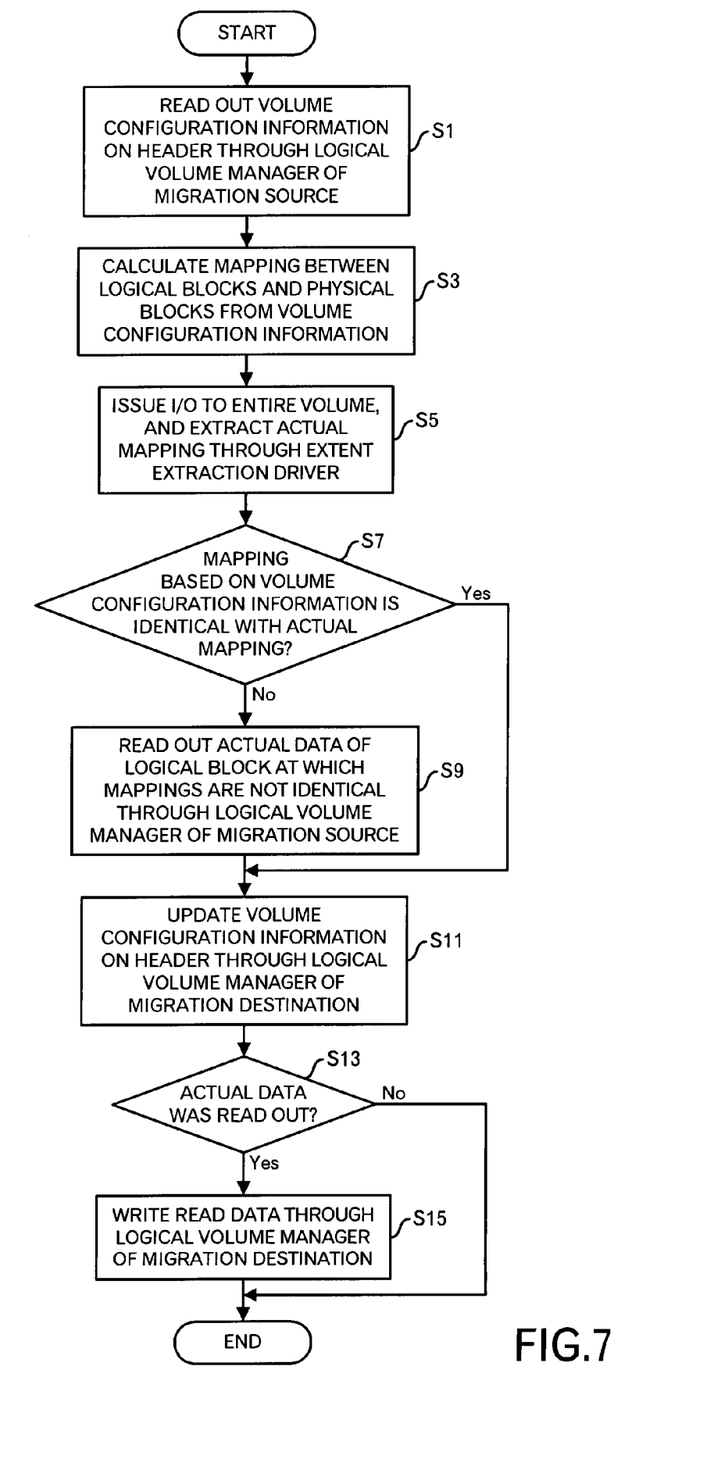
FIG. 7 is a diagram showing a processing flow according to the first embodiment of this invention.
Figure 8:
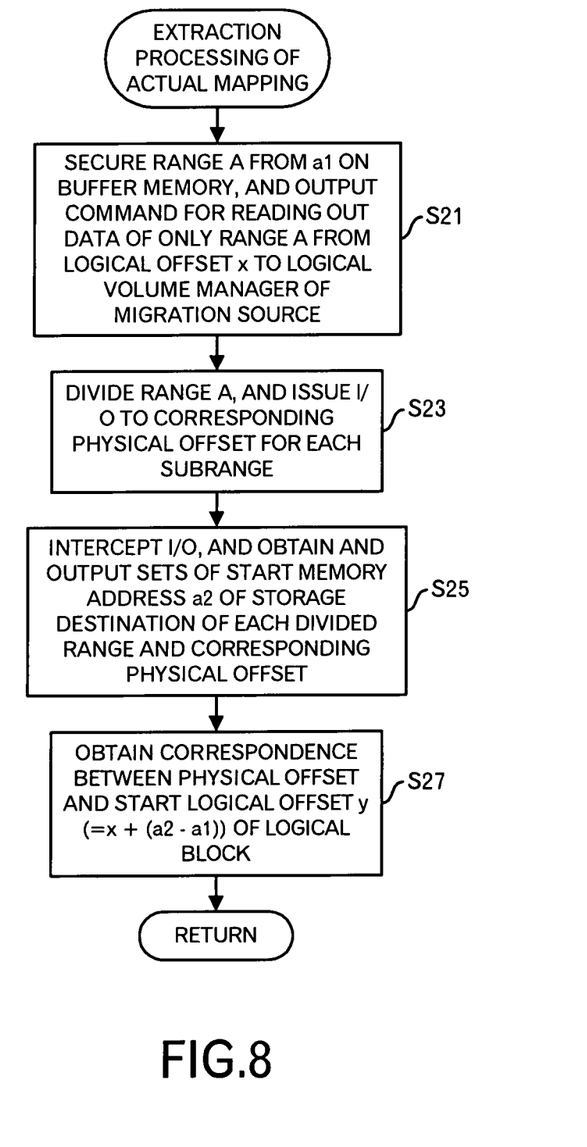
FIG. 8 is a diagram showing a processing flow of an obtaining processing of a mapping between the logical blocks and the physical blocks.

Returning to the explanation of FIG. 7, the volume migration tool 1 judges whether or not the mapping based on the volume configuration information is identical to the actual mapping (step S7). When the correspondence relation between the logical blocks and the physical blocks is completely identical, the processing shifts to step S11. When there is even one logical block at which the correspondence relation between the logical blocks and the physical blocks is not identical, it is judged that the exceptional data layout is made.

Then, as shown by an arrow (3) of FIG. 1, the volume migration tool 1 reads out actual data of the logical blocks at which the mapping does not match through the logical volume manager 3 of the migration source and the physical device driver 9 of the migration source (step S9). Because the logical blocks at which the mapping does not match are identified, the volume migration tool 1 causes the logical volume manager 3 of the migration source to read out such logical blocks.

Then, when it is judged at the step S7 that the mappings are completely identical or after the step S9, as shown by an arrow (4) of FIG. 1, the volume migration tool 1 updates the volume configuration information on the header area for the logical volume manager 7 of the migration destination through the logical volume manager 7 of the migration destination and the physical device driver 11 of the migration destination (step S11). The data as shown in FIGS. 3 to 5 is written onto the header area in a format handled by the logical volume manager 7 of the migration destination. The old head area is overwritten by the new head information.

After that, the volume migration tool 1 judges whether or not the actual data was read out at the step S9 (step S13), the processing ends when the actual data is not read out. On the other hand, when the actual data was read out, as shown by an arrow (5) of FIG. 1, the volume migration tool 1 writes the read data onto the physical disk 13 through the logical volume manager 7 of the migration destination and the physical device driver 11 of the migration destination (step S15). By carrying out such a processing, an appropriate writing is carried out by the logical volume manager 7 of the migration destination according to the mapping of the logical volume manager 7 of the migration destination, and after the migration, an appropriate data utilization can be carried out.

By carrying out the processing as described above, it is possible to accurately confirm whether or not the exceptional data layout is made, and when the exceptional data layout is not made, it is enough to update only the header area. On the other hand, even when the exceptional data layout is made, it is enough to copy and rewrite the portion relating to the exceptional data layout. Therefore, the volume migration can be carried out at high-speed.

Embodiment 2

In the first embodiment, it is supposed that an operation of the volume to be migrated is stopped during the layout check (the step S5 of FIG. 7) in order not to newly make the exceptional data layout during the layout check. Although the speed of the processing of the extent extraction driver 5 is sufficiently high, there is a case where it takes several ten minutes by the processor speed of a normal server to check the volume of several ten TB level.

Figure 10:
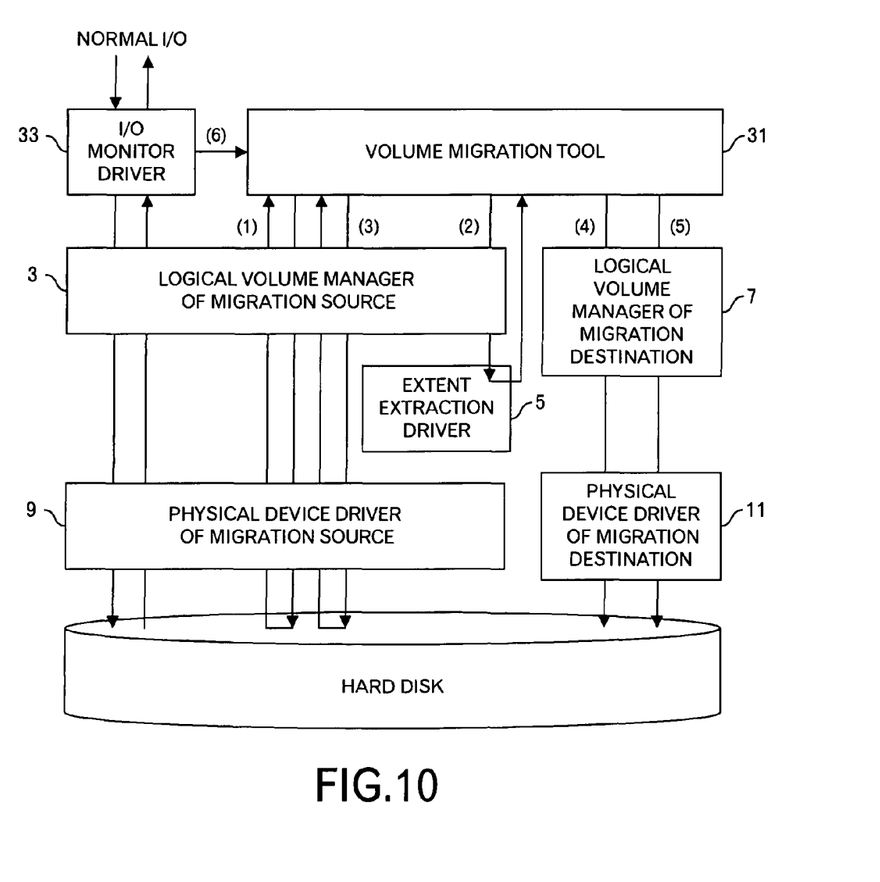
FIG. 10 is a functional block diagram according to a second embodiment of this invention.

Then, in order to reduce the time the operation stops, the layout check is carried out in parallel with the operation. For this purpose, a configuration as shown in FIG. 10 is adopted. Specifically, because the block for which the normal I/O is carried out by the operation has possibility that the exceptional data layout is newly made by the logical volume manager 3 of the migration source, an I/O monitor driver 33 is introduced, and the normal I/O is monitored by the I/O monitor driver 33, and the logical volume offset for which the I/O is carried out is fed back to the volume migration tool 31 (an arrow (6) of FIG. 10).

As shown by an arrow (2), the volume migration tool 31 initially carries out I/Os for the entire logical volume offsets in the step S5 in the processing flow of FIG. 7, and accepts the logical volume offset the normal I/O occurs from the I/O monitor driver 33 during the I/O for the entire logical volume offsets. Then, after the initial I/Os have been completed, the layout check (step S5) is carried out again for the logical volume offsets accepted from the I/O monitor driver 33 up to the completion. The logical volume offsets the normal I/O occurs during the second layout check are accepted from the I/O monitor driver 33, and after the completion of the second layout check, the step S5 is carried out again for the logical volume offsets accepted up to the completion of the second layout check.

Because the extent extraction driver 5 never outputs the actual I/O request to the physical device driver 9 of the migration source, the layout check can be completed faster than the accumulation of the feedback from the I/O monitor driver 33. Therefore, finally, all the layout checks including the feedback are always completed.

Therefore, the aforementioned processing is repeated until the normal I/O does not occur during the execution of the layout check, and the operation of the migration source is stopped at that time. Then, the processing of the step S7 and subsequent steps is carried out. Then, the operation stop time can be reduced.

Embodiment 3

Figure 11:
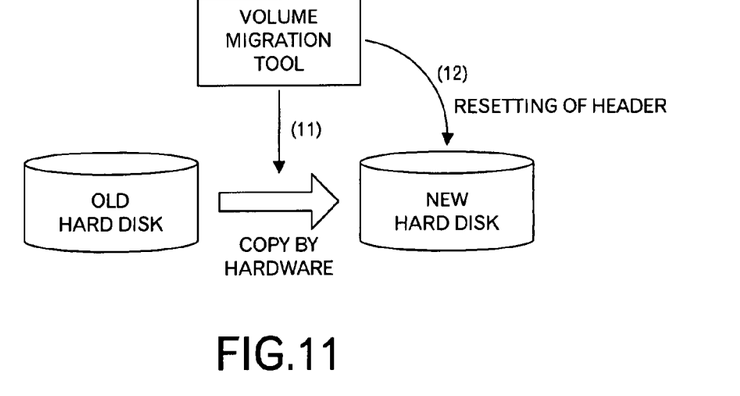
FIG. 11 is a schematic diagram to explain a third embodiment of this invention.

It is assumed that the volume migration uses the same physical disk also in the migration destination as it is. However, there is a case where the physical disk is also migrated according to circumstances such as performance and capacity. In such a case, the old hard disk and the new hard disk are connected to the system, and as shown in FIG. 11, the inter-disk copy by the hardware is carried out by instructing from the volume migration tool 1, for example (an arrow (11)). The inter-disk copy by the hardware can be carried out at high-speed. After that, when the processing shown in FIG. 7 is carried out (an arrow (12)), the volume migration can be carried out at high-speed in addition to the migration of the physical disk.

Embodiment 4

Furthermore, there is a case where the user would like to carry out the extension of the volume in addition to the addition of the physical disk in the volume migration. In such a case, the user inputs information concerning what physical disk was added and information concerning how configures the logical volume into the volume migration tool 1, and the volume migration tool 1 writes the volume configuration information to which the volume expansion is reflected onto the header area at the step S11 in the processing flow of FIG. 7.

Figure 12:
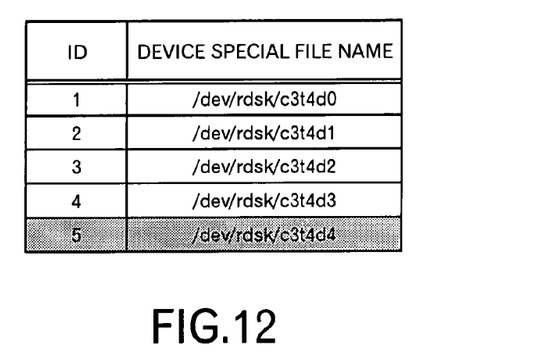
FIG. 12 is a diagram showing an example of physical device information when carrying out a volume expansion.
Figure 13:
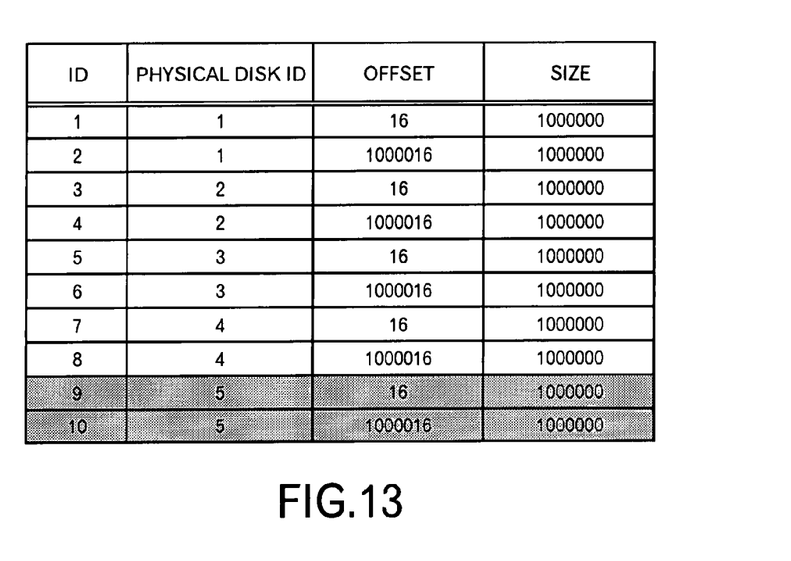
FIG. 13 is a diagram showing an example of subdisk information when carrying out the volume expansion.
Figure 14:
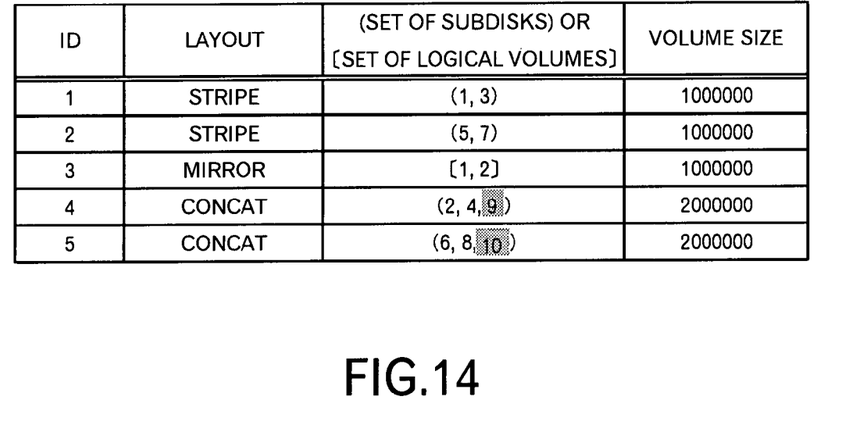
FIG. 14 is a diagram showing an example of logical volume information when carrying out the volume expansion.

For example, when, in the example of FIGS. 3 to 5, the physical disk whose ID is "5" is added, the physical disk is divided to two subdisks, and further the added subdisks are respectively added to the logical volume 4 and the logical volume 5, data as shown in FIGS. 12 to 14 is written onto the header area as the volume configuration information for the logical volume manager 7 of the migration destination.

FIG. 12 shows an example of the updated physical device information. Compared with FIG. 3, the physical disk whose ID is "5" is added. In addition, FIG. 13 shows an example of the updated subdisk information. Compared with FIG. 4, the records for the subdisks whose IDs are "9" and "10" are added. Furthermore, FIG. 14 shows an example of the updated logical volume information. Compared with FIG. 5, the subdisks are added for the logical volumes whose IDs are "4" and "5".

Figure 15:
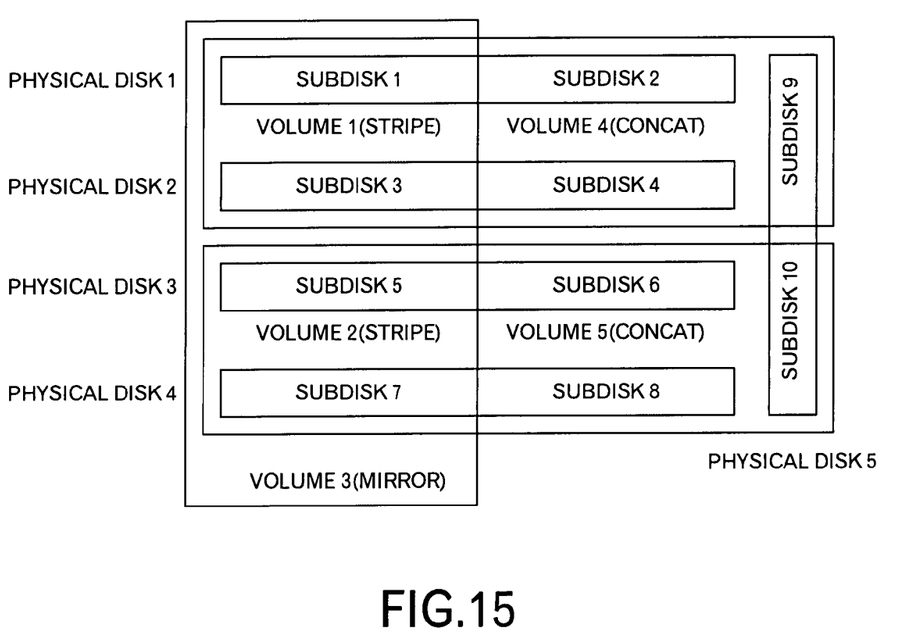
FIG. 15 is a schematic diagram of FIGS. 12 to 14.

When summarizing FIGS. 12 to 14, the new configuration is as shown in FIG. 15. Compared with FIG. 6, it can be understood that the subdisk 9 of the physical disk 5 is added to the logical volume 4 (CONCAT), and the subdisk 10 of the physical disk 5 is added to the logical volume 5 (CONCAT). By this information, the expansion of the volume by adding the physical disk is registered into the header area by the logical volume manager 7 of the migration destination.

Thus, by carrying out the volume expansion in addition to the volume migration once, the speed of the entire migration processing becomes high because there is no need to separately carry out the volume expansion work.

Although the embodiments of this invention were described above, this invention is not limited to those embodiments. For example, in the aforementioned embodiments, the current volume configuration information is read out at the step S1 of FIG. 7. However, when the current volume configuration cannot be interpreted, it is possible to identify, as the portion at which the exceptional data layout is made, a portion at which the physical offsets obtained at the step S5 has a difference from the sequence of the neighboring physical offsets.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A computer-readable, non-transitory storage medium storing a program for causing a computer to carry out a migration of a volume from a first volume manager to a second volume manager, said migration comprising:
   causing said first volume manager to issue I/O orders for an entire volume of a physical medium in a state where there is no first mapping made by the first volume manager, between logical volume offsets and physical blocks on said physical medium;
   intercepting, by a program module, said I/O orders by said first volume manager to extract the first mapping, wherein said program module prevents said I/O orders from being outputted to said physical medium;
   judging whether or not said first mapping is identical to a second mapping based on volume configuration information stored in a header area on said physical medium; and
   upon detecting that it is judged that said first mapping is identical to said second mapping, updating a header area on said physical medium for said second volume manager.

2. The computer-readable, non-transitory storage medium as set forth in claim 1, further comprising:
   upon detecting that it is judged that said first mapping is not identical to said second mapping, reading out data relating to differences between said first mapping and said second mapping from said physical medium through said first volume manager;
   updating said header area on said physical medium for said second volume manager; and
   causing said second volume manager to write the read data relating to said differences onto said physical medium.

3. The computer-readable, non-transitory storage medium as set forth in claim 1, wherein said intercepting comprises:
   identifying logical volume offsets to which other normal program accesses; and
   causing said first volume manager to issue I/O orders to the identified logical volume offsets again.

4. The computer-readable, non-transitory storage medium as set forth in claim 1, further comprising:
   reading out said volume configuration information stored in said header area on said physical medium through said first volume manager, and calculating said second mapping that is a mapping between said logical volume offsets and said physical blocks on said physical medium based on said volume configuration information.

5. The computer-readable, non-transitory storage medium as set forth in claim 1, further comprising:
   copying data from said physical medium being used to a second physical medium, and
   wherein said intercepting, said judging, and said updating are carried out for said second physical medium.

6. The computer-readable, non-transitory storage medium as set forth in claim 1, wherein said updating comprises:
   registering a volume expansion.

7. A volume migration method for causing to carry out a migration of a volume from a first volume manager to a second volume manager, said volume migration comprising:
   causing said first volume manager to issue I/O orders for an entire volume of a physical medium in a state where there is no first mapping made by the first volume manager, between logical volume offsets and physical blocks on said physical medium,
   intercepting, by a program module, said I/O orders by said first volume manager to generate the first mapping, wherein said program module prevents said I/O orders from being outputted to said physical medium;
   judging whether or not said first mapping is identical to a second mapping based on volume configuration information stored in a header area on said physical medium; and
   upon detecting that it is judged that said said first mapping is identical to said second mapping, updating a header area on said physical medium for said second volume manager.

8. The volume migration method as set forth in claim 7, further comprising:
   upon detecting that it is judged that said first mapping is not identical to said second mapping, reading out data relating to differences between said first mapping and said second mapping from said physical medium through said first volume manager;
   updating said header area on said physical medium for said second volume manager; and
   causing said second volume manager to write the read data relating to said differences onto said physical medium.

9. The volume migration method as set forth in claim 7, wherein said intercepting comprises:
   identifying logical volume offsets to which other normal program accesses; and
   causing said first volume manager to issue I/O orders to the identified logical volume offsets again.

10. The volume migration method as set forth in claim 7, further comprising:
    reading out said volume configuration information stored in said header area on said physical medium through said first volume manager, and calculating said second mapping that is a mapping between said logical volume offsets and said physical blocks on said physical medium based on said volume configuration information.

11. The volume migration method as set forth in claim 7, further comprising:
    copying data from said physical medium being used to a second physical medium, and
    wherein said intercepting, said judging, and said updating are carried out for said second physical medium.

12. The volume migration method as set forth in claim 7, wherein said updating comprises:
registering a volume expansion.

13. A volume migration system for carrying out a migration from a first volume manager to a second volume manager, comprising:
an obtaining unit that causes said first volume manager to issue I/O orders for an entire volume of a physical medium in a state where there is no first mapping made by the first volume manager, between logical volume offsets and physical blocks on said physical medium, and intercepts, by a program module, said I/O orders by said first volume manager to generate the first mapping, wherein said program module prevents said I/O orders from being outputted to said physical medium;
a judging unit that judges whether or not said first mapping is identical to a second mapping based on volume configuration information stored in a header area on said physical medium;
a unit that updates, upon detecting that it is judged that said first mapping is identical to said second mapping, a header area on said physical medium for said second volume manager; and
a processor for controlling said obtaining unit, said judging unit, and said unit that updates.

14. The volume migration system as set forth in claim 13, further comprising:
a unit that reads out, upon detecting that it is judged that said first mapping is not identical to said second mapping, data relating to differences between said first mapping and said second mapping from said physical medium through said first volume manager;
a unit that updates said header area on said physical medium for said second volume manager; and
a unit that causes said second volume manager to write the read data relating to said differences onto said physical medium.

15. The volume migration system as set forth in claim 13, wherein said obtaining unit comprises:
a unit that identifies logical volume offsets to which other normal program accesses; and
a unit that causes said first volume manager to issue I/O orders to the identified logical volume offsets again.

16. The volume migration system as set forth in claim 13, further comprising:
a unit that reads out said volume configuration information stored in said header area on said physical medium through said first volume manager, and calculates said second mapping that is a mapping between said logical volume offsets and said physical blocks on said physical medium based on said volume configuration information.

* * * * *

UNITED STATES PATENT AND TRADEMARK OFFICE
CERTIFICATE OF CORRECTION

| | |
|---|---|
| PATENT NO. | : 8,601,230 B2 |
| APPLICATION NO. | : 11/894998 |
| DATED | : December 3, 2013 |
| INVENTOR(S) | : Takeshi Miyamae |

It is certified that error appears in the above-identified patent and that said Letters Patent is hereby corrected as shown below:

In the Claims:

Col. 8, line 32, Claim 7 delete second occurrence of "said"

Signed and Sealed this
Thirtieth Day of September, 2014

Michelle K. Lee
*Deputy Director of the United States Patent and Trademark Office*